(12) United States Patent
Zemenchik (10) Patent No.: US 10,959,367 B2
(45) Date of Patent: Mar. 30, 2021

(54) SYSTEM AND METHOD FOR CONTROLLING AN AGRICULTURAL TILLAGE IMPLEMENT

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

(*) Notice: Subject to any disclaimer, the term of this patent is extended or adjusted under 35 U.S.C. 154(b) by 255 days.

(21) Appl. No.: 16/150,856

(22) Filed: Oct. 3, 2018

(65) Prior Publication Data

US 2020/0107490 A1 Apr. 9, 2020

(51) Int. Cl.
*A01B 79/00* (2006.01)
*A01B 63/00* (2006.01)
*A01B 71/02* (2006.01)
*A01B 63/32* (2006.01)

(52) U.S. Cl.
CPC .......... *A01B 79/005* (2013.01); *A01B 63/008* (2013.01); *A01B 63/32* (2013.01); *A01B 71/02* (2013.01)

(58) Field of Classification Search
CPC ..... A01B 79/005; A01B 63/008; A01B 71/02; A01B 63/002; A01B 79/00; A01B 49/027; A01B 63/28
See application file for complete search history.

(56) References Cited

U.S. PATENT DOCUMENTS

| | | | |
|---|---|---|---|
| 7,723,660 B2 * | 5/2010 | Holland | A01B 79/005 250/206.1 |
| 9,516,802 B2 | 12/2016 | Zemenchik | |
| 10,028,424 B2 | 7/2018 | Zemenchik et al. | |
| 2015/0296701 A1 * | 10/2015 | Anderson | A01B 79/00 172/2 |
| 2015/0305226 A1 * | 10/2015 | Zemenchik | A01B 63/32 701/50 |
| 2015/0310633 A1 * | 10/2015 | Nelan | G06T 7/0002 382/110 |
| 2017/0112043 A1 * | 4/2017 | Nair | A01B 17/002 |
| 2017/0223947 A1 * | 8/2017 | Gall | G01N 21/4738 |
| 2018/0049361 A1 * | 2/2018 | Zemenchik | A01B 49/027 |
| 2018/0108123 A1 * | 4/2018 | Baurer | A01G 7/00 |
| 2018/0128933 A1 * | 5/2018 | Koch | A01C 7/105 |
| 2020/0107490 A1 * | 4/2020 | Zemenchik | A01B 71/02 |

* cited by examiner

*Primary Examiner* — Redhwan K Mawari
(74) *Attorney, Agent, or Firm* — Rebecca L. Henkel; Rickard K. DeMille (57) ABSTRACT

An agricultural implement controller configured to receive a first signal indicative of at least one image of a field and to determine a crop residue mass map of the field based on the at least one image. In addition, the agricultural implement controller is configured to receive a second signal indicative of a position of an agricultural tillage implement within the field and to determine a target penetration depth, a target downforce, a target speed, or a combination thereof, of at least one ground engaging tool based on the crop residue mass map of the field and the position of the agricultural tillage implement. Furthermore, the agricultural implement controller is configured to output a third signal indicative of instructions to control at least one actuator coupled to the at least one ground engaging tool based on the target penetration depth, the target downforce, the target speed, the combination thereof.

13 Claims, 3 Drawing Sheets

SYSTEM AND METHOD FOR CONTROLLING AN AGRICULTURAL TILLAGE IMPLEMENT

BACKGROUND

The present disclosure relates generally to a system and method for controlling an agricultural tillage implement.

Certain agricultural implements include ground engaging tools configured to interact with the soil and/or residue disposed on the surface of the soil. The residue may include plant matter from previously harvested crops, weeds (e.g., living or destroyed), other organic material, or a combination thereof. For example, a tillage implement may include tillage points, disc blades, leveling discs, finishing reels, or a combination thereof, configured to condition the soil and/or the residue for subsequent planting or seeding operations. Typically, an operator of the tillage implement may set the penetration depth (e.g., vertical penetration depth) and/or the downforce (e.g., vertical downforce) applied by the ground engaging tools (e.g., tillage points, disc blades, leveling discs, finishing reels, etc.) prior to tillage operations (e.g., based on soil conditions, field profile, crop residue quantity, etc.). However, the mass of crop residue, the profile of the terrain, soil types, and/or the types of subsequently planted crops may vary throughout the field. Accordingly, using fixed penetration depth/downforce settings may result in uneven and/or less effective tillage throughout the field (e.g., including inadequate and/or excessive ground cover). As a result, the soil may be less protected from erosive rainfall in sloped regions of the field, and/or crop emergence may be delayed during a cool/wet spring, thereby reducing crop yield from subsequent harvesting operations.

BRIEF DESCRIPTION

In certain embodiments, an agricultural implement controller includes a memory and a processor. The agricultural implement controller is configured to receive a first signal indicative of at least one pre-tillage image of a field and to determine a crop residue mass map of the field based on the at least one pre-tillage image. In addition, the agricultural implement controller is configured to receive a second signal indicative of a position of an agricultural tillage implement within the field. The agricultural implement controller is also configured to determine a target penetration depth, a target downforce, a target ground speed, or a combination thereof, of at least one ground engaging tool based on the crop residue mass map of the field and the position of the agricultural tillage implement. Furthermore, the agricultural implement controller is configured to output a third signal indicative of instructions to control at least one actuator coupled to the at least one ground engaging tool based on the target penetration depth, the target downforce, the target ground speed, or the combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
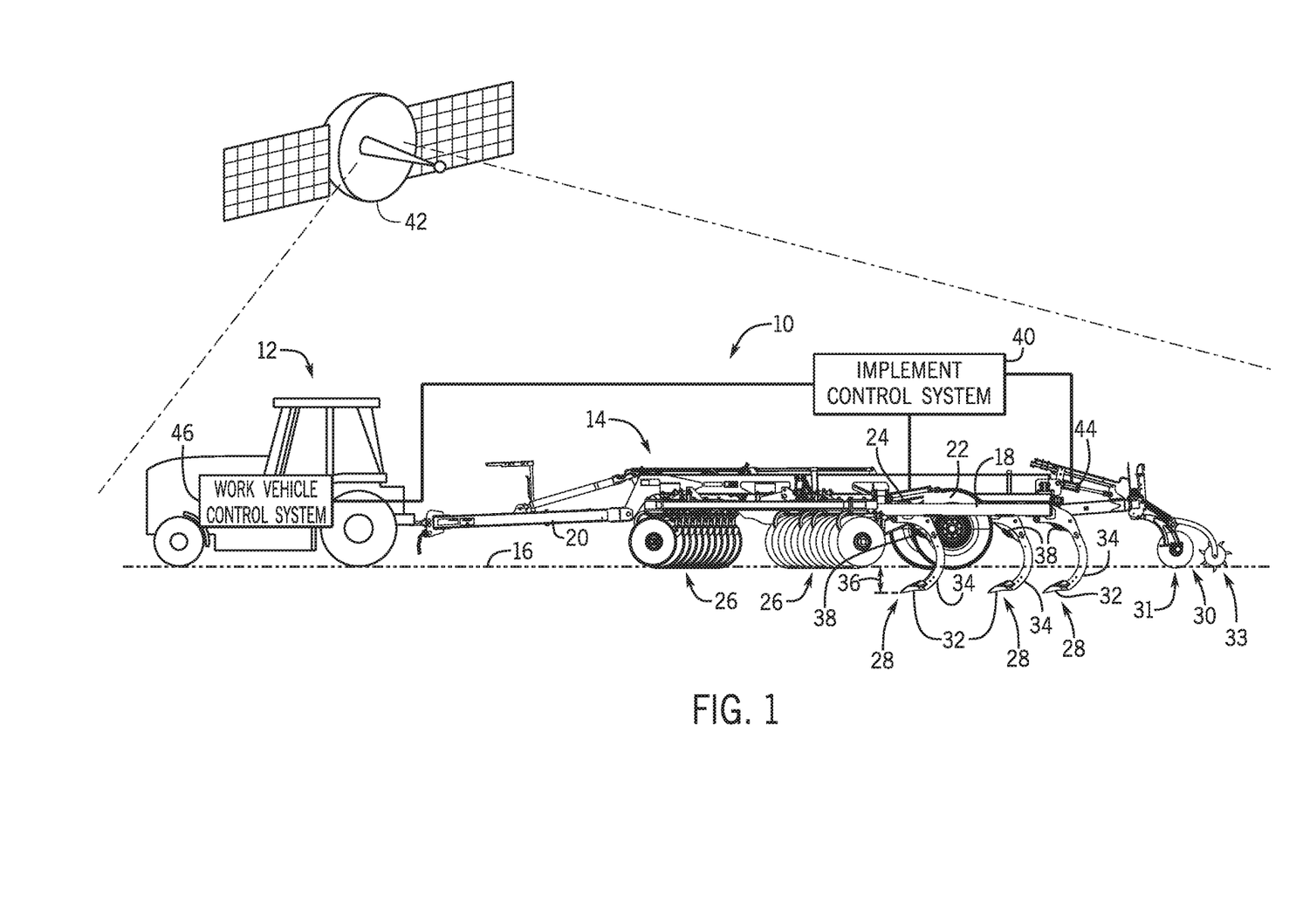
FIG. 1 is a side view of an embodiment of an agricultural system having a work vehicle and an agricultural tillage implement.

Turning to the drawings, FIG. 1 is a side view of an embodiment of an agricultural system 10 having a work vehicle 12 and an agricultural tillage implement 14. In the illustrated embodiment, the agricultural tillage implement 14 is a primary tillage implement having multiple ground engaging tools configured to till soil 16. As illustrated, the agricultural tillage implement 14 includes a frame 18 and a hitch assembly 20 coupled to the frame 18. The hitch assembly 20 is configured to couple to the work vehicle 12 (e.g., tractor or other prime mover), and the work vehicle 12 is configured to tow the agricultural tillage implement 14 through a field. In the illustrated embodiment, the agricultural tillage implement 14 includes wheels 22 configured to engage the surface of the soil 16 and to support at least a portion of the agricultural tillage implement 14. In addition, the agricultural tillage implement 14 includes an actuator 24 (e.g., cylinder) configured to move the wheels 22 from the illustrated raised position to a lowered position. While the wheels 22 are in the illustrated raised position, ground engaging tools of the agricultural tillage implement 14 engage the soil 16. As the agricultural tillage implement 14 is towed through the field, the ground engaging tools condition the soil and/or the residue disposed on the surface of the soil for subsequent planting or seeding operations. The actuator 24 may lower the wheels 22 from the illustrated raised position to the lowered position. As a result, the ground engaging tools are disengaged from the soil 16 to facilitate transport of the agricultural implement 14 (e.g., between successive rows of the field).

In the illustrated embodiment, the agricultural tillage implement 14 includes disc blades 26, tillage point assemblies 28, and finishing assemblies 30. The disc blades 26 are configured to engage a top layer of the soil. As the agricultural tillage implement 14 is towed through the field, the disc blades 26 are driven to rotate, thereby breaking up the top layer and sizing residue on the surface of the field. In the illustrated embodiment, the disc blades 26 are arranged in two rows. However, in alternative embodiments, the disc blades may be arranged in more or fewer rows (e.g., 1, 2, 3, 4, 5, 6, or more). In addition, the angle of each row may be selected to control the interaction of the disc blades 26 with the top layer of soil. For example, the disc blades may be arranged in one or more gangs, and an actuator (e.g., hydraulic cylinder, linear actuator, etc.) may adjust the angle of the gang relative to the direction of travel of the implement. The tillage point assemblies 28 are configured to engage the soil at a greater depth, thereby breaking up a lower layer of the soil 16. In the illustrated embodiment, each tillage point assembly 28 includes a tillage point 32 and a shank 34. The shank 34 is configured to position the tillage point 32 at a target penetration depth 36 (e.g., vertical penetration depth) beneath the soil surface, and the tillage point 32 is configured to break up the soil 16. The shape of each tillage point, the arrangement of the tillage point assemblies, and the number of tillage point assemblies may be selected to control tillage within the field. Furthermore, In the illustrated embodiment, each finishing assembly 30 includes one or more leveling discs 31 and one or more finishing reels 33. However, in certain embodiments, at least one finishing assembly may include only leveling disc(s) or only finishing reel(s). As the agricultural implement 14 is towed through the field, the leveling discs 31 and the finishing reels 33 of the finishing assembly 30 are driven to rotate, thereby sizing soil clods, leveling the soil surface, smoothing the soil surface, destroying weeds, cutting and/or burying residue on the soil surface, or a combination thereof.

In the illustrated embodiment, each tillage point assembly 28 is configured to move from a working state (e.g., in which the tillage point is positioned at the target penetration depth) to a deflected state in response to contact with an obstruction in the field (e.g., a rock, a stump, etc.). As illustrated, a spring 38 extends between a bracket mounted to the frame 18 and the shank 34 of a respective tillage point assembly 28. The spring 38 is configured to urge the tillage point assembly 28 toward the working state, such that the tillage point assembly is maintained in the working state until an obstruction is encountered along the direction of travel. The spring 38 may drive (e.g., force) the tillage point assembly 28 from the deflected state to the working state after the tillage point assembly 28 clears the obstruction. While a spring 38 is coupled to each tillage point assembly 28 in the illustrated embodiment, in other embodiments, another suitable biasing element (e.g., a pneumatic cylinder, a hydraulic cylinder, a resilient material, etc.) may be coupled to at least one tillage point assembly. Furthermore, in certain embodiments, at least one tillage point assembly may be fixedly coupled to the frame. Furthermore, in certain embodiments, one or more ground engaging tools (e.g., tillage point assemblies) may be fixedly coupled to a frame section, and the frame section may be movably coupled to the agricultural implement frame. For example, the agricultural tillage implement may include multiple movable frame sections distributed throughout the agricultural implement frame. One or more springs may extend between each frame section and the agricultural implement frame. The spring(s) may be configured to urge the respective frame section toward a working state, such that the ground engaging tools are maintained in the working state until an obstruction is encountered along the direction of travel. The spring(s) may drive (e.g., force) the respective frame section from a deflected state to the working state after the ground engaging tools clears the obstruction.

In the illustrated embodiment, the agricultural tillage implement 14 includes a control system (e.g., the illustrated implement control system 40) having the actuator 24. As discussed in detail below, the agricultural implement control system 40 is configured to control the penetration depth (e.g., vertical penetration depth) and/or the downforce (e.g., vertical downforce) of the ground engaging tools based on at least one pre-tillage image of the field. For example, in certain embodiments, the agricultural implement control system 40 includes a controller configured to receive a first signal indicative of at least one pre-tillage image of the field. The pre-tillage image(s) may include or be derived from a multispectral image and/or a hyperspectral image of the field. In addition, the controller is configured to determine a crop residue mass map of the field based on the pre-tillage image(s). The controller is also configured to receive a second signal indicative of a position of the agricultural tillage implement 14 within the field (e.g., from a spatial locating device). Furthermore, the controller is configured to determine a target penetration depth and/or a target downforce of at least one ground engaging tool based on the crop residue mass map of the field and the position of the agricultural tillage implement (e.g., along a direction of travel, within a field, etc.). The controller is also configured to output a third signal indicative of instructions to control at least one actuator (e.g., the frame actuator 24) coupled to the at least one ground engaging tool based on the target penetration depth and/or the target downforce. By controlling the penetration depth and/or the downforce of the ground engaging tool(s) based on a residue mass map of the field, a target ground cover (e.g., target ground cover percentage, target ground cover mass, etc.) may be established throughout the field. As a result, the yield potential of agricultural products subsequently harvested from the field may be enhanced. In addition, because the residue mass map is determined based on at least one pre-tillage image of the field (e.g., multispectral and/or hyperspectral image), the residue mass map may be more accurate than a residue mass map determined based on crop yield or on a correlated harvest index (e.g., mass of grain divided by the total mass of above-ground biomass (e.g., grain plus residue)) determined by a harvester during a previous season. Accordingly, the agricultural product yield potential within the field may be further enhanced (e.g., over the long term as soil in more erosive regions is more effectively managed).

In the illustrated embodiment, the controller of the implement control system 40 is configured to receive the pre-tillage image(s) of the field from a satellite 42. The satellite 42 may capture the pre-tillage image(s) of the field during a previous growing season (e.g., just prior to harvesting). As previously discussed, the pre-tillage image(s) may include a multispectral image and/or a hyperspectral image of the field. As used herein, "multispectral image" refers to an image that includes image data for multiple widely-spaced spectral bands (e.g., red, green, blue, near infrared, far infrared, etc.). Furthermore, as used herein, "hyperspectral image" refers to an image that includes image data for multiple narrowly-spaced spectral bands (e.g., 10 spectral bands within a 100 nm spectral range). The controller of the implement control system may determine the crop residue mass map of the field based on the pre-tillage image(s). For example, the pre-tillage image(s) may include a near infrared image and a visible light image of the field, or the pre-tillage image(s) may include a single multispectral image having near infrared image data and visible light image data. The controller may determine a normalized difference vegetation index (NDVI) map of the field based on the near infrared image/image data and the visible light image/image data. The NDVI map may include data indicative of a distribution of non-grain portions of the crops throughout the field. Because the non-grain portion of the crops substantially corresponds to the crop residue after harvesting, the controller may determine the crop residue mass map of the field based on the NDVI map.

While the pre-tillage image(s) are provided by the satellite 42 in the illustrated embodiment, in other embodiments, the pre-tillage image(s) may be provided by other suitable imaging device(s) (e.g., alone or in combination with the satellite). For example, in certain embodiments, the pre-tillage image(s) may be provided by one or more satellites, one or more unmanned aerial vehicles, one or more handheld or ground-vehicle mounted cameras, other suitable imaging device(s), or a combination thereof. The pre-tillage image(s) may be provided directly from the image device(s) to the controller via the signal indicative of the pre-tillage image(s), or the pre-tillage image(s) may be stored within remote server(s) and provided to the controller at a suitable time via the signal indicative of the pre-tillage image(s). Furthermore, while multispectral and hyperspectral images are disclosed above, in certain embodiments, the controller of the implement control system may determine the crop residue mass map based on other suitable images, such as multiple single-spectral images, etc. In addition, while determining the crop residue mass map by creating an intermediate NDVI map is disclosed above, in certain embodiments, the controller may be configured to determine the residue mass map directly from the pre-tillage image(s). In certain embodiments, the pre-tillage image(s) are captured prior to harvesting the agricultural crops during the previous growing season. However, in other embodiments, the pre-tillage image(s) may be captured after harvesting.

In certain embodiments, the implement control system 40 is configured to control the height of the frame 18 to control the penetration depth of the disc blades 26 and the tillage points 32 of the tillage point assemblies 28. For example, the controller may determine a target penetration depth of the disc blades 26 and the tillage points 32 based on the crop residue mass map and the position of the agricultural tillage implement 14 within the field. For example, if the controller determines that a current ground cover percentage/mass (e.g., which may be determined based on the current penetration depth of the ground engaging tools and the crop residue mass map of the field) is greater than a target ground cover percentage/mass at the current location of the agricultural tillage implement 14, the controller may instruct the actuator 24 to lower the frame 18 relative to the soil surface, thereby increasing the penetration depth of the disc blades 26 and the tillage points 32. As a result, more residue may be buried within the soil, thereby decreasing the ground cover percentage/mass (e.g., substantially to the target ground cover percentage/mass). In addition, if the controller determines that the current ground cover percentage/mass is less than the target ground cover percentage/mass at the current location of the agricultural tillage implement 14, the controller may instruct the actuator 24 to raise the frame 18 relative to the soil surface, thereby decreasing the penetration depth of the disc blades 26 and the tillage points 32. As a result, less residue may be buried within the soil, thereby increasing the ground cover percentage/mass. Substantially establishing the target ground cover percentage/mass throughout the field may increase the yield potential of subsequently harvested agricultural crops.

Furthermore, in certain embodiments, the implement control system 40 is configured to control a finishing assembly actuator 44 to control the downforce applied by the leveling disc(s) 31 and the finishing reel(s) 33 to the soil 16. For example, the controller may determine a target downforce of the leveling disc(s)/finishing reel(s) based on the crop residue mass map and the position of the agricultural tillage implement 14 within the field. For example, if the controller determines that a current ground cover percentage/mass (e.g., which may be determined based on the current downforce of the leveling disc(s)/finishing reel(s) and the crop residue mass map of the field) is greater than a target ground cover percentage/mass at the current location of the agricultural tillage implement 14, the controller may instruct the actuator 44 to increase the downforce applied by the leveling disc(s)/finishing reel(s) to the soil 16. As a result, more residue on the soil surface may be cut, thereby decreasing the ground cover percentage/mass (e.g., substantially to the target ground cover percentage/mass). In addition, if the controller determines that the current ground cover percentage/mass is less than the target ground cover percentage/mass at the current location of the agricultural tillage implement 14, the controller may instruct the actuator 44 to reduce the downforce applied by the leveling disc(s)/finishing reel(s) to the soil 16. As a result, less residue on the soil surface may be cut, thereby increasing the ground cover percentage/mass. Substantially establishing the target ground cover percentage/mass throughout the field may increase the yield potential of subsequently harvested agricultural crops.

In certain embodiments, the penetration depth of the disc blades/tillage points and the downforce applied by the leveling disc(s)/finishing reel(s) may be controlled concurrently to substantially establish a target ground cover percentage/mass throughout the field. Furthermore, while controlling the penetration depth of the disc blades and tillage points is disclosed above, in certain embodiments, the downforce applied by the disc blades and/or the tillage points may be controlled to control the ground cover percentage/mass. In addition, while controlling the downforce applied by the leveling disc(s) and finishing reel(s) is disclosed above, in certain embodiments, the penetration depth of the leveling disc(s) and/or finishing reel(s) may be controlled to control the ground cover percentage/mass. In certain embodiments, the penetration depth and/or the downforce of the ground engaging tools (e.g., disc blades, tillage point assemblies, leveling disc(s), finishing reel(s), etc.) may be controlled individually or in groups to control the ground cover percentage/mass across the width of the agricultural tillage implement, for example.

In the illustrated embodiment, the implement control system 40 is communicatively coupled to a work vehicle control system 46. The implement control system 40 may be configured to output data indicative of the penetration depth and/or the downforce of the ground engaging tool(s) to the work vehicle control system 46. The work vehicle control system 46 may include a user interface configured to present a graphical and/or numeric representation of the penetration depth and/or the downforce on a display of the user interface (e.g., as a penetration depth and/or downforce map of the field). The user interface may also be configured to present a graphical representation of the pre-tillage image(s), the NDVI map, a target ground cover (e.g., percentage ground cover, ground cover mass, etc.) map, a crop residue mass map, a topographical map, a soil property map, an agricultural implement ground speed map, or a combination thereof. The work vehicle control system may also be configured to store and/or output (e.g., to a remote server, to a cloud network, etc.) the penetration depth/downforce data, data associated with the pre-tillage image(s), data associated with the NDVI map, data associated with the crop residue mass map, data associated with the topographical map, data associated with the soil property map, data associated with the agricultural implement ground speed map, or a combination thereof.

While the illustrated agricultural tillage implement includes the disc blades 26, the tillage point assemblies 28, and the finishing assemblies 30, in other embodiments, the agricultural tillage implement may include other and/or additional ground engaging tools (e.g., coulters, tines, etc.). In addition, in certain embodiments, at least one of the disc blades, the tillage point assemblies, the leveling discs(s), and/or the finishing reels may be omitted. Furthermore, while the agricultural tillage implement is towed by a work vehicle in the illustrated embodiment, in other embodiments, the agricultural tillage implement may be self-propelled. In addition, while the implement control system described herein is used to control the grounding engaging tools of an agricultural tillage implement, in other embodiments, the implement control system may be utilized to control ground engaging tools of other suitable implements (e.g., a planting implement, a seeding implement, a disc harrow, a vertical tillage tool, or another suitable implement having ground engaging tool(s)).

Figure 2:
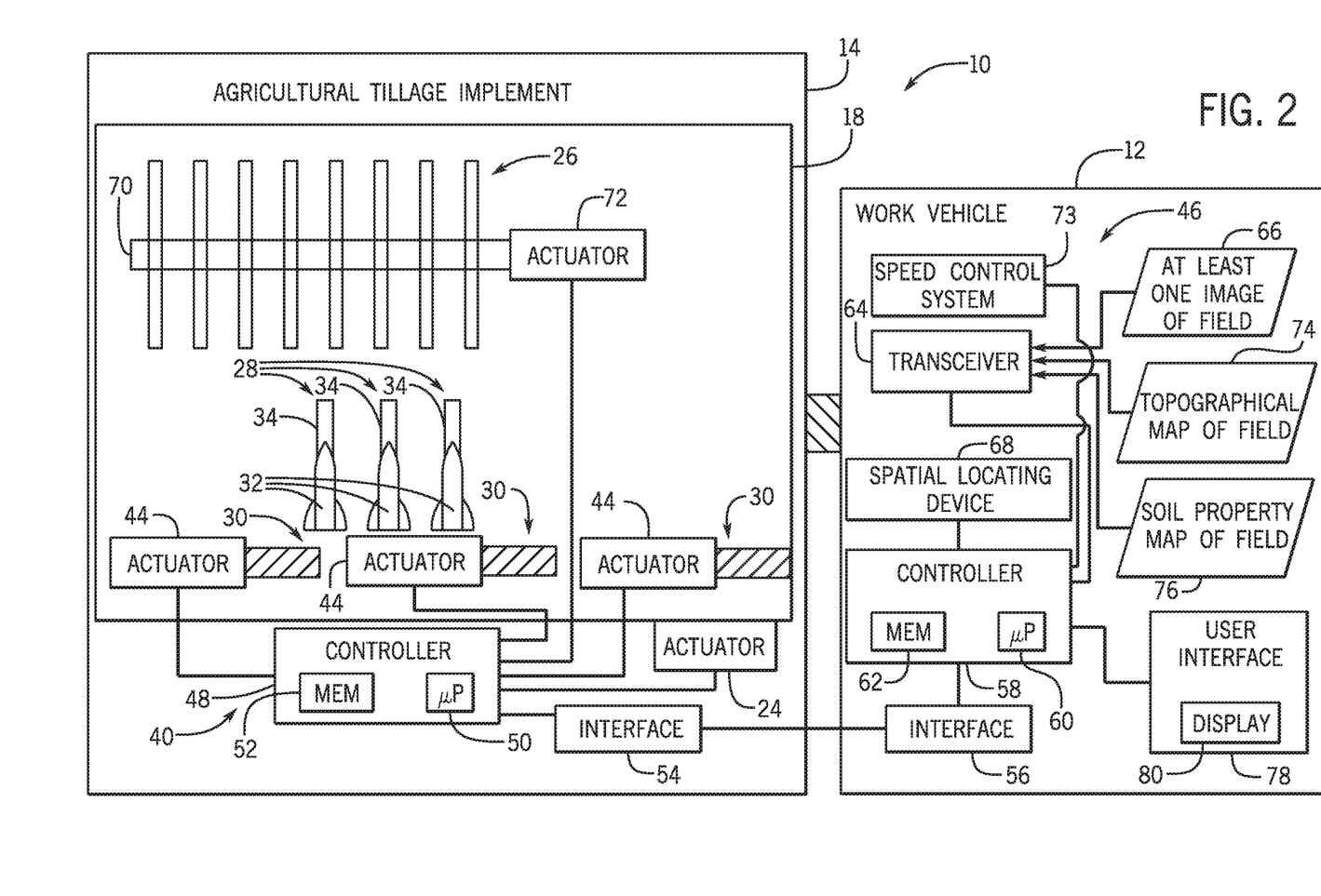
FIG. 2 is a block diagram of an embodiment of an agricultural system having a work vehicle and an agricultural tillage implement.

FIG. 2 is a block diagram of an embodiment of an agricultural system 10 having the work vehicle 12 and the agricultural tillage implement 14. In the illustrated embodiment, the agricultural tillage implement 14 includes the disc openers 26, the tillage point assemblies 28, and the finishing assemblies 30. The agricultural tillage implement 14 also includes the implement control system 40 configured to control the penetration depth and/or downforce of ground engaging tools based on a crop residue mass map to establish a target ground cover throughout the field. In the illustrated embodiment, the implement control system 42 includes a controller 48 communicatively coupled to the implement frame actuator 24 and the finishing assembly actuators 44.

In certain embodiments, the controller 48 is an electronic controller having electrical circuitry configured to output instructions to one or more actuators of the implement control system 40. In the illustrated embodiment, the controller 48 includes a processor, such as the illustrated microprocessor 50, and a memory device 52. The controller 48 may also include one or more storage devices and/or other suitable components. The processor 50 may be used to execute software, such as software for controlling one or more actuators of the implement control system 40, and so forth. Moreover, the processor 50 may include multiple microprocessors, one or more "general-purpose" microprocessors, one or more special-purpose microprocessors, one or more application specific integrated circuits (ASICS), and/or one or more field-programmable gate arrays (FPGA), or some combination thereof. For example, the processor 50 may include one or more reduced instruction set (RISC) processors.

The memory device 52 may include a volatile memory, such as random access memory (RAM), and/or a nonvolatile memory, such as read-only memory (ROM). The memory device 52 may store a variety of information and may be used for various purposes. For example, the memory device 52 may store processor-executable instructions (e.g., firmware or software) for the processor 50 to execute, such as instructions for controlling one or more actuators of the implement control system 40, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., target ground cover percentage(s)/mass(es), etc.), instructions (e.g., software or firmware for controlling the actuators, etc.), and any other suitable data.

In the illustrated embodiment, the controller 48 is configured to receive a signal (e.g., first signal) indicative of at least one pre-tillage image of the field. As previously discussed, the pre-tillage image(s) may include a multispectral image and/or a hyperspectral image of the field. In the illustrated embodiment, the pre-tillage image(s) are received from the work vehicle control system 46. However, in other embodiments, the pre-tillage image(s) may be received from any suitable source, such as a transceiver communicatively coupled to the controller or from a storage device within and/or communicatively coupled to the controller.

In the illustrated embodiment, the controller 48 is configured to receive the signal indicative of the pre-tillage image(s) of the field from the work vehicle control system 46 via an interface 54. As illustrated, the interface 54 is communicatively coupled to the controller 48 and to a corresponding interface 56 of the work vehicle control system 46. The interface 56 of the work vehicle control system 46, in turn, is communicatively coupled to a controller 58 of the work vehicle control system 46. The interfaces may be communicatively coupled to one another by any suitable connection, such as a wireless connection or a wired connection. In addition, the interfaces may communicate with one another using any suitable communication protocol, such as a standard communication protocol (e.g., CAN bus, ISOBUS, Wi-Fi, Bluetooth, etc.) or a proprietary protocol.

In certain embodiments, the controller 58 is an electronic controller having electrical circuitry configured to output data to the interface 56 and to other components of the work vehicle control system 46. In the illustrated embodiment, the controller 58 includes a processor, such as the illustrated microprocessor 60, and a memory device 62. The controller 58 may also include one or more storage devices and/or other suitable components. The processor 60 may be used to execute software, such as software for outputting data to the interface 56 and/or to one or more other components of the work vehicle control system 46, and so forth. Moreover, the processor 60 may include multiple microprocessors, one or more "general-purpose" microprocessors, one or more special-purpose microprocessors, and/or one or more application specific integrated circuits (ASICS), or some combination thereof. For example, the processor 60 may include one or more reduced instruction set (RISC) processors.

The memory device 62 may include a volatile memory, such as random access memory (RAM), and/or a nonvolatile memory, such as read-only memory (ROM). The memory device 62 may store a variety of information and may be used for various purposes. For example, the memory device 62 may store processor-executable instructions (e.g., firmware or software) for the processor 60 to execute, such as instructions for outputting data to the interface 56 and/or one or more other components of the work vehicle control system 46, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for processing data, etc.), and any other suitable data.

In the illustrated embodiment, the work vehicle controller 58 is communicatively coupled to a transceiver 64. The transceiver 64 is configured to receive data from a remote server, a base station, a handheld device, a laptop computer, another suitable data storage/transfer system, or a combination thereof. The transceiver may be configured to establish a wireless communication link with the remote device using a standard or propriety communication protocol. In the illustrated embodiment, the transceiver 64 is configured to receive image data 66 indicative of the pre-tillage image(s) of the field. The transceiver 64, in turn, is configured to output the image data 66 to the controller 58, and the controller 58 is configured to output a signal indicative of the pre-tillage image(s) of the field to the agricultural implement controller 48 via the interfaces.

In the illustrated embodiment, the work vehicle control system 46 includes a spatial locating device 68 communicatively coupled to the work vehicle controller 58. The spatial locating device 68 is configured to output a signal (e.g., second signal) indicative of a position, and in certain embodiments a velocity, of the work vehicle 12 (e.g., along the direction of travel, within a field, etc.). The spatial locating device 68 may include any suitable system configured to measure and/or facilitate determination of the position of the work vehicle 12, such as a GPS receiver, for example. The spatial locating device 68 may output the signal indicative of the position/velocity of the work vehicle 12 to the agricultural implement controller 48 (e.g., via the work vehicle controller 58, the work vehicle interface 56, and the agricultural implement interface 54). While the spatial locating device is coupled to the work vehicle 12 in the illustrated embodiment, in other embodiments, the spatial locating device may be coupled to the agricultural tillage implement (e.g., and communicatively coupled directly to the agricultural implement controller.

In the illustrated embodiment, the agricultural implement controller 48 is configured to receive the image data 66 indicative of the pre-tillage image(s) of the field (e.g., via the transceiver 64, the work vehicle controller 58, the work vehicle interface 56, and the agricultural implement interface 54). In addition, the agricultural implement controller 48 is configured to receive a signal (e.g., second signal) indicative of the position of the agricultural tillage implement 14 within the field (e.g., from the spatial locating device 68 via the work vehicle controller 58, the work vehicle interface 56, and the agricultural implement interface 54). The agricultural implement controller 48 is also configured to determine a crop residue mass map of the field based on the pre-tillage image(s). For example, the agricultural implement controller 48 may determine an NDVI map of the field based on the pre-tillage image(s) and determine the crop residue mass map based on the NDVI map. Furthermore, the agricultural implement controller 48 is configured to determine a target penetration depth and/or a target downforce of ground engaging tool(s) based on the crop residue mass map and the position the agricultural tillage implement. The agricultural implement controller 48 is also configured to output a signal (e.g., third signal) indicative of instructions to control actuator(s) coupled to the ground engaging tool(s) based on the target penetration depth and/or the target downforce. While the agricultural implement controller 48 is configured to determine the NDVI map based on the pre-tillage image(s) in the illustrated embodiment, in other embodiments, the agricultural implement controller 48 may be configured to receive the NDVI map (e.g., from a remote server). In such embodiments, the NDVI map may be considered the pre-tillage image(s) of the field because the NDVI map corresponds to a graphical representation of the non-grain portion of the crops within the field.

In certain embodiments, the agricultural implement controller 48 may determine a target penetration depth of the disc blades 26 and the tillage points 32 of the tillage point assemblies 28 (e.g., a first penetration depth of the disc blades and a second penetration depth of the tillage points) based on the crop residue mass map of the field and the position of the agricultural tillage implement within the field. The agricultural implement controller 48 may then output a signal to the frame actuator 24 indicative of instructions to move the frame 18 such that the disc blades 26 and the tillage points 32 are positioned at the target penetration depth (e.g., respective target penetration depths) within the field. For example, if the controller 48 determines that a ground cover percentage or mass is greater than a target ground cover percentage or mass at the current location of the agricultural tillage implement 14 (e.g., based on the current penetration depth of the ground engaging tools and the residue mass map of the field), the controller 48 may instruct the actuator 24 to lower the frame 18 relative to the soil surface, thereby increasing the penetration depth of the disc blades 26 and the tillage points 32. As a result, more residue may be buried within the soil, thereby decreasing the ground cover percentage/mass substantially to the target ground cover percentage/mass. In addition, if the controller determines that the ground cover percentage/mass is less than a target ground cover percentage/mass at the current location of the agricultural tillage implement 14 (e.g., based on the current penetration depth of the ground engaging tools and the residue mass map of the field), the controller may instruct the actuator 24 to raise the frame 18 relative to the soil surface, thereby decreasing the penetration depth of the disc blades 26 and the tillage points 32. As a result, less residue may be buried within the soil, thereby increasing the ground cover percentage/mass. Establishing the target ground cover percentage/mass throughout the field may increase the yield potential of subsequently harvested agricultural crops.

In certain embodiments, a hitch actuator may be controlled with the frame actuator 24 to control the height of the agricultural implement frame relative to the soil surface, while maintaining levelness of the frame. For example, as the frame actuator raises the frame relative to the soil surface, the hitch actuator may adjust the position of the hitch assembly 20, such that the implement frame remains substantially level relative to the soil surface. However, in other embodiments, the agricultural tillage implement may be configured such that the frame actuator alone controls the height of the agricultural implement frame (e.g., with the frame remaining substantially level during height adjustments).

In the illustrated embodiment, the disc blades 26 are arranged in a gang and configured to rotate about a common shaft 70. While the illustrated agricultural tillage implement 14 includes a single gang of disc blades 26, in other embodiments, the agricultural tillage implement may include more or fewer gangs (e.g., 0, 1, 2, 3, 4, 5, 6, or more). For example, in certain embodiments, the agricultural tillage implement may include a front gang of disc blades and a rear gang of disc blades. In the illustrated embodiment, the implement control system 40 includes a gang actuator 72 configured to control an angle of the disc blade gang relative to the direction of travel of the agricultural tillage implement 14. The gang actuator 72 may include a hydraulic cylinder, a hydraulic motor, a linear actuator, another suitable type of actuator, or a combination thereof. As illustrated, the gang actuator 72 is communicatively coupled to the agricultural implement controller 48 (e.g., via a valve assembly). The agricultural implement controller 48 may be configured to instruct the gang actuator 72 to adjust the gang angle based on the crop residue mass map and the position of the agricultural tillage implement. For example, the agricultural implement controller 48 may determine a target gang angle based on the crop residue mass map of the field and the position of the agricultural tillage implement within the field. The agricultural implement controller 48 may then output a signal indicative of instructions to control the gang actuator 72 such that the gang of disc blades 26 is oriented substantially at the target gang angle (e.g., which is determined based on the amount of crop residue present at the position of the agricultural tillage implement within the field). While a single gang of disc blades 26 is coupled to the gang actuator 72 in the illustrated embodiment, in other embodiments, multiple disc blade gangs may be coupled to the gang actuator. In addition, in certain embodiments, the implement control system may include multiple gang actuator (e.g., each actuating one or more disc blade gangs). Furthermore, in certain embodiments, an actuator may be configured to move a gang of other ground engaging tools relative to the implement frame. For example, an actuator may be configured to move a gang of tillage point assemblies relative to the implement frame. In addition, in certain embodiments, at least one ground engaging tool (e.g., disc blade) may be mounted to the same frame as a respective gang (e.g., frame section, agricultural implement frame, etc.) independently of the gang, and/or at least one ground engaging tool may be mounted to a frame that does not support a gang.

In the illustrated embodiment, the agricultural tillage implement 14 includes three finishing assemblies 30, and the agricultural implement control system 40 includes three finishing assembly actuators 44, each configured to control the downforce of a respective finishing assembly 30 (e.g., based on the length of the leveling reel, to establishing a substantially uniform leveling reel downforce across the width of the agricultural tillage implement, etc.). As previously discussed, each finishing assembly 30 may include one or more leveling discs and/or one or more finishing reels. In certain embodiments, the finishing assemblies 30 may be positioned to overlap one another along a lateral axis of the agricultural tillage implement 14, such that the finishing assemblies engage the soil surface along a substantial portion of the width of the agricultural tillage implement. While the illustrated agricultural tillage implement 14 includes three finishing assemblies 30, in other embodiments, the agricultural tillage implement may include more or fewer finishing assemblies (e.g., 0, 1, 2, 3, 4, 5, 6, or more). In certain embodiments, the agricultural implement controller 48 may be configured to independently control the downforce applied to the soil by each finishing assembly. The agricultural implement controller may determine the location of each finishing assembly based on the position of the agricultural tillage implement. For example, the position of the agricultural implement may be determined at a reference point on the agricultural implement, and the position of each finishing assembly may be determined based on the position of the reference point within the field and the offset between the reference point and the respective finishing assembly. The crop residue mass at the position of each finishing assembly may be determined based on the crop residue mass map. The agricultural implement controller 48 may determine a target downforce for each finishing assembly based on the crop residue mass at the position of each finishing assembly, and then output a signal indicative of instructions to control each respective finishing assembly actuator 44 based on the respective target downforce. For example, each finishing assembly actuator 44 may be controlled such that the downforce applied by the leveling disc(s)/finishing reel(s) of the respective finishing assembly is substantially equal to the respective target downforce. However, in alterative embodiments, a single target downforce may be determined for all or a portion of the finishing assemblies based on the crop residue mass map, and the finishing assembly actuators may be controlled such that all or the portion of the finishing assemblies apply substantially equal downforces. While a single finishing assembly 30 is coupled to each finishing assembly actuator 44 in the illustrated embodiment, in other embodiments, multiple finishing assemblies may be coupled to at least one finishing assembly actuator.

Furthermore, in certain embodiments, the downforce and/or the penetration depth of the leveling disc(s) of at least one finishing assembly may be controlled independently of the downforce and/or the penetration depth of the finishing reel(s). For example, a first actuator may be coupled to the leveling disc(s) of a finishing assembly, and a second actuator may be coupled to the finishing reel(s) of the finishing assembly. The controller may control each actuator to independently control the penetration depth/downforce of the leveling disc(s) and the finishing reel(s).

In certain embodiments, the agricultural implement control system 40 may include sensor(s) communicatively coupled to the controller 48 and configured to output signal(s) indicative of penetration depth and/or downforce. For example, in certain embodiments, a position sensor (e.g., linear potentiometer, linear variable differential transformer (LVDT), ultrasonic sensor, proximity sensor, etc.) may be coupled to the frame of the agricultural tillage implement. In such embodiments, the sensor may provide feedback to the agricultural implement controller for controlling the penetration depth of the disc blades and/or the tillage points. Furthermore, in certain embodiments, a force sensor (e.g., load cell, strain gauge, etc.) may be coupled to at least one finishing assembly. In such embodiments, the sensor may provide feedback to the agricultural implement controller for controlling the downforce applied by the at least one finishing assembly. In addition, other suitable sensor(s) may be configured to output force and/or position signal(s) to facilitate control of the ground engaging tool(s) of the agricultural tillage implement.

While controlling the penetration depth of the disc blades and the tillage points of the tillage point assemblies is disclosed above, in other embodiments, the pentation depth of other suitable ground engaging tools may be controlled. For example, in certain embodiments, the penetration depth of at least one leveling disc and/or at least one finishing reel may be controlled, and/or the penetration depth of another suitable ground engaging tool may be controlled, such as a coulter or a tine. Furthermore, in certain embodiments, the penetration depth of one ground engaging tool may be controlled independently of the penetration depth of another ground engaging tool (e.g., based on the location of the ground engaging tool on the implement and the crop residue mass map of the field). For example, in certain embodiments, the penetration depth of at least one tillage point may be controlled independently of the penetration depth of at least one other tillage point. By way of further example, the penetration depth of at least one disc blade may be controlled independently of the penetration depth of at least one tillage point. To facilitate independent control of certain ground engaging tools, a first set of ground engaging tools (e.g., the disc blades) may be fixedly mounted to a first frame second, and a second set of ground engaging tools (e.g., the tillage point assemblies) may be fixedly mounted to a second frame section. Each frame section may be independently movable relative to the agricultural implement frame, and a respective actuator may be coupled to each frame section. In certain embodiments, the agricultural implement controller is configured to independently control the frame section actuators, thereby controlling the penetration depth of the first set of ground engaging tools independently of the second set of ground engaging tools. While two frame sections are disclosed above, the agricultural tillage implement may include more or fewer frame sections (e.g., 1, 2, 3, 4, 5, 6, or more). In addition, in certain embodiments, the penetration depth of certain ground engaging tools may be controlled individually or in groups by respective actuator(s) via other suitable ground engaging tool/frame mounting arrangement(s).

Furthermore, while controlling the downforce of the finishing assembly is disclosed above, in other embodiments, the downforce of other suitable ground engaging tools may be controlled. For example, in certain embodiments, the downforce of the disc blades and/or the tillage points may be controlled, and/or the downforce of another suitable ground engaging tool may be controlled, such as a coulter or a tine. In addition, in certain embodiments, the downforce of one ground engaging tool may be controlled independently of the penetration depth of another ground engaging tool (e.g., based on the location of the ground engaging tool on the implement and the crop residue mass map of the field). For example, in certain embodiments, the downforce of at least one disc blade may be controlled independently of the downforce of at least one tillage point. As previously discussed, to facilitate independent control of certain ground engaging tools, a first set of ground engaging tools may be fixedly mounted to a first frame second, and a second set of ground engaging tools may be fixedly mounted to a second frame section. Each frame section may be independently movable relative to the agricultural implement frame, and a respective actuator may be coupled to each frame section. In certain embodiments, the agricultural implement controller is configured to independently control the frame section actuators, thereby controlling the downforce of the first set of ground engaging tools independently of the second set of ground engaging tools. While two frame sections are disclosed above, the agricultural tillage implement may include more or fewer frame sections (e.g., 1, 2, 3, 4, 5, 6, or more). In addition, in certain embodiments, the downforce of certain ground engaging tools may be controlled individually or in groups by respective actuator(s) via other suitable ground engaging tool/frame mounting arrangement(s).

As previously discussed, the agricultural implement controller is configured to determine a target penetration depth and/or downforce of at least one ground engaging tool based on the crop residue mass map and the position of the agricultural tillage implement. In addition, the agricultural implement controller is configured to output a signal indicative of instructions to control at least one actuator coupled to the at least one ground engaging tool based on the target penetration depth and/or the target downforce. In certain embodiments, the agricultural implement controller is configured to determine the target penetration depth/downforce at the current location of the at least one ground engaging tool (e.g., which may be based on the current position of an agricultural implement position reference point and an offset between the reference point and the at least one ground engaging tool), and to output the signal indicative of instructions to control the at least one respective actuator based on the target penetration depth/downforce. Furthermore, in certain embodiments, the agricultural implement controller is configured to determine the target penetration depth/downforce at a future location of the at least one ground engaging tool, and to output the signal indicative of instruction to control the at least one respective actuator based on the target penetration depth/downforce. The future location may correspond to the location of the at least one ground engaging tool at a future time, and the future time may be the current time plus a ground engaging tool reaction time, in which the ground engaging tool reaction time corresponds to a time sufficient for the at least one ground engaging tool to transition from a current penetration depth/downforce to the target penetration depth/downforce. Determining the target penetration depth/downforce at the future location may further enhance the accuracy of tillage operations, thereby increasing the yield potential of the subsequently harvested agricultural products.

In the illustrated embodiment, the work vehicle control system 46 includes a speed control system 73. In certain embodiments, the speed control system 73 may include an engine output control system, a transmission control system, a braking control system, or a combination thereof. The engine output control system may vary the output of the engine to control the speed of the work vehicle. For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the work vehicle. Furthermore, the braking control system may adjust braking force, thereby controlling the speed of the work vehicle. In further embodiments, the speed control system may include other and/or additional systems to facilitate adjusting the speed of the work vehicle.

In certain embodiments, the agricultural implement controller 48 is configured to output a signal (e.g., third signal) to the speed control system 73 (e.g., actuator coupled to the ground engaging tool(s)) indicative of instructions to control the speed of the agricultural tillage implement 14 based on the crop residue mass map and the position of the agricultural tillage implement. For example, the agricultural implement controller 48 may output a speed control signal to the work vehicle controller 58 via the agricultural implement interface 54 and the work vehicle interface 56, and the work vehicle controller 58 may output the speed control signal to the speed control system 73. In certain embodiments, the agricultural implement controller may determine a target ground speed of the agricultural tillage implement 14/ground engaging tool(s) based on the crop residue mass map of the field and the position of the agricultural tillage implement 14 within the field. For example, if the agricultural implement controller determines that a current ground cover percentage/mass (e.g., which may be determined based on the current penetration depth of the ground engaging tools, the current ground speed of the agricultural tillage implement along the direction of travel, and the crop residue mass map of the field) is greater than a target ground cover percentage/mass at the current location of the agricultural tillage implement 14, the controller may determine a target ground speed greater than the current ground speed. The agricultural implement controller may then output a signal indicative of the target ground speed to the speed control system. The speed control system, in turn, may increase the speed of the agricultural tillage implement/ground engaging tool(s), such that the current ground speed is substantially equal to the target ground speed, thereby increasing the degree of tillage performed by the ground engaging tools. As a result, more residue may be cut and/or buried within the soil, thereby decreasing the ground cover percentage/mass (e.g., substantially to the target ground cover percentage/mass). In addition, if the controller determines that the current ground cover percentage/mass is less than the target ground cover percentage/mass at the current location of the agricultural tillage implement 14, the controller may determine a target ground speed less than the current ground speed. The agricultural implement controller may then output a signal indicative of the target ground speed to the speed control system. The speed control system, in turn, may reduce the speed of the agricultural tillage implement/ground engaging tool(s), such that the current ground speed is substantially equal to the target ground speed, thereby reducing the degree of tillage performed by the ground engaging tools. As a result, less residue may be cut and/or buried within the soil, thereby increasing the ground cover percentage/mass. Substantially establishing the target ground cover percentage/mass throughout the field may increase the yield potential of subsequently harvested agricultural crops. The ground speed of the agricultural tillage implement/ground engaging tool(s) may be controlled alone or in combination with the penetration depth and/or downforce control disclosed above to control the ground cover percentage/mass throughout the field. In addition, in certain embodiments, the ground speed may not be controlled, and the ground cover percentage/mass may be controlled via control of the penetration depth and/or downforce.

The agricultural implement controller is configured to determine the target penetration depth and/or the target downforce of the ground engaging tool(s) based on the crop residue mass map of the field and the position of the agricultural tillage implement within the field, and in certain embodiments, a topographical map of the field and/or a soil property map of the field. In the illustrated embodiment, the transceiver 64 is configured to receive topographical data 74 indicative of a topographical map of the field. The transceiver 64, in turn, is configured to output the topographical data 74 to the work vehicle controller 58, and the work vehicle controller 58 is configured to output a signal (e.g., fourth signal) indicative of the topographical map of the field to the agricultural implement controller 48 via the work vehicle interface 56 and the agricultural implement interface 54. The agricultural implement controller 48 is configured to receive the signal (e.g., fourth signal) indicative of the topographical map of the field, and the agricultural implement controller 48 is configured to determine the target penetration depth, the target downforce, the target ground speed, or a combination thereof, of the ground engaging tool(s) based on the topographical map. The agricultural implement controller 48 may determine a target ground cover map based on the topographical map of the field. For example, the controller may establish a higher ground cover percentage (e.g., 50 to 70 percent) or mass for regions with a higher slope and a lower ground cover percentage (e.g., 10 to 30 percent) or mass for regions with a lower slope. The higher ground cover percentage/mass within the higher slope regions may substantially reduce precipitation-induced soil nutrient losses (e.g., losses due to soil nutrients being entrained in runoff from the soil). The agricultural implement controller 48 may determine the target penetration depth/downforce/ground speed of the ground engaging tool(s) based on the target ground cover map, the crop residue mass map, and the position of the agricultural tillage implement (e.g., such that the ground cover percentage/mass substantially corresponds to the target ground cover percentage/mass throughout the field). The agricultural implement controller 48 may then output a signal indicative of instructions to control the actuator(s) coupled to the ground engaging tool(s) based on the target penetration depth, the target downforce, the target ground speed, or a combination thereof.

In the illustrated embodiment, the transceiver 64 is configured to receive soil property data 76 indicative of a soil property map of the field. The soil properties may include soil type, organic matter content, soil moisture, soil texture, soil density, another suitable soil property, or a combination thereof. The transceiver 64, in turn, is configured to output the soil property data 76 to the work vehicle controller 58, and the work vehicle controller 58 is configured to output a signal (e.g., fifth signal) indicative of the soil property map of the field to the agricultural implement controller 48 via the work vehicle interface 56 and the agricultural implement interface 54. The agricultural implement controller 48 is configured to receive the signal (e.g., fifth signal) indicative of the soil property map of the field, and the agricultural implement controller 48 is configured to determine the target penetration depth, the target downforce, the target ground speed, or a combination thereof, of the ground engaging tool(s) based on the soil property map. The agricultural implement controller 48 may determine a target ground cover map based on the soil property map of the field. For example, the controller may establish a higher ground cover percentage/mass for regions having higher soil nutrients, smoother soil texture, and/or soil structure more prone to erosion, and a lower ground cover percentage/mass for regions having lower soil nutrients, coarser soil texture, and/or soil structure less prone to erosion. The higher ground cover percentage/mass within the higher soil nutrient/smoother soil texture/more erosion prone regions may substantially reduce soil nutrient losses. The agricultural implement controller 48 may determine the target penetration depth/downforce/ground speed of the ground engaging tool(s) based on the target ground cover map, the crop residue mass map, and the position of the agricultural tillage implement (e.g., such that the ground cover percentage/mass substantially corresponds to the target ground cover percentage/mass throughout the field). The agricultural implement controller 48 may then output a signal indicative of instructions to control the actuator(s) coupled to the ground engaging tool(s) based on the target penetration depth, the target downforce, the target ground speed, or a combination thereof.

In the illustrated embodiment, the work vehicle control system 46 includes a user interface 78 communicatively coupled to the controller 58. The user interface 78 is configured to provide input to the controller 58 and to receive output from the controller 58. As illustrated, the user interface 78 includes a display 80. The display 80 is configured to present information to an operator, such as a graphical and/or numeric representation of the penetration depth and/or the downforce of the ground engaging tool(s). In certain embodiments, the display 80 may be a touch screen display configured to receive input from the operator. The user interface 78 may also include other input devices (e.g., keyboard, mouse, switches, buttons, etc.) configured to receive input from the operator. In certain embodiments, the user interface may include a mobile device (e.g., phone, tablet, etc.) communicatively coupled to the work vehicle controller via a suitable interface (e.g., Wi-Fi, cell network, etc.).

As previously discussed, the agricultural implement controller 48 is configured to output a signal indicative of instructions to control actuator(s) coupled to the ground engaging tools(s). The signal may be output to the actuator(s) and to the work vehicle controller 58 (e.g., via the agricultural implement interface 54 and the work vehicle interface 56). The work vehicle controller 58 may receive the signal and instruct the user interface 78 to present a graphical and/or numeric representation of the target penetration depth and/or the target downforce on the display 80. The work vehicle controller 58 may also receive a signal from the agricultural implement controller 48 indicative of a current penetration depth and/or a current downforce of at least one ground engaging tool (e.g., which may be determined based on feedback from the sensor(s)). The work vehicle controller 58, in turn, may instruct the user interface 78 to present a graphical and/or numeric representation of the current penetration depth and/or the current downforce on the display 80. The user interface 78 may also be configured to present a graphical representation of the pre-tillage image(s), the NDVI map, the crop residue mass map, the topographical map, the soil property map, the target ground cover (e.g., percentage ground cover, ground cover mass, etc.) map, an agricultural implement ground speed map, or a combination thereof, on the display 80. Furthermore, the work vehicle controller 58 and/or the agricultural implement controller 48 may be configured to store and/or output (e.g., to a remote server, to a cloud network, etc.) the target penetration depth/downforce data, the current penetration depth/downforce data, data associated with the pre-tillage image(s), data associated with the NDVI map, data associated with the crop residue mass map, data associated with the topographical map, data associated with the soil property map, data associated with the target ground cover (e.g., percentage ground cover, ground cover mass, etc.) map, data associated with the agricultural implement ground speed map, or a combination thereof (e.g., for subsequent agricultural operations).

While the crop residue mass map determination and ground engaging tool control process described above is performed by the agricultural implement controller 48 in the illustrated embodiment, in other embodiments, at least part of the crop residue mass map determination and ground engaging tool control process may be performed by the work vehicle controller 58, another suitable controller, or any suitable combination of the work vehicle controller 58, the agricultural implement controller 48, and the other suitable controller. In such embodiments, the other controller(s) that perform at least part of the crop residue mass map determination and ground engaging tool control process may be considered element(s) of the agricultural implement controller, such that the agricultural implement controller performs the crop residue mass map determination and ground engaging tool control process. Furthermore, in certain embodiments, the user interface may be positioned remotely from the work vehicle (e.g., in embodiments in which the agricultural system is controlled by a remote operator).

Figure 3:
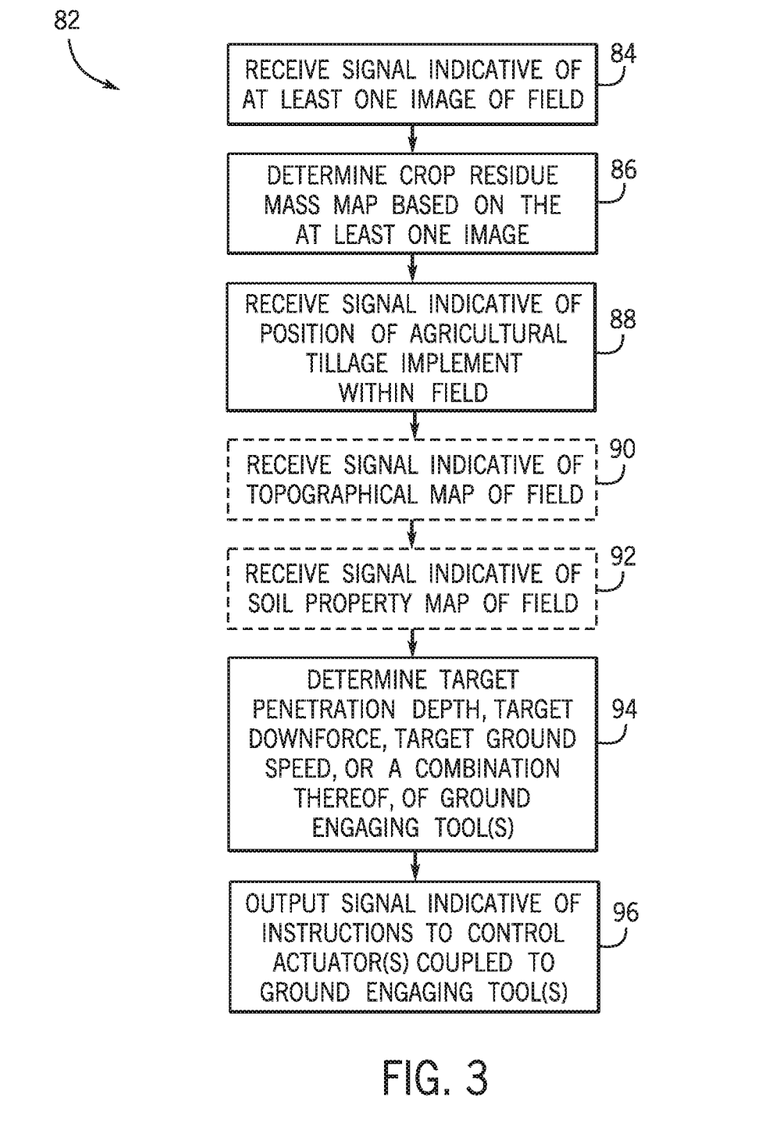
FIG. 3 is a flow diagram of an embodiment of a method for controlling an agricultural tillage implement.

FIG. 3 is a flow diagram of an embodiment of a method 82 for controlling an agricultural tillage implement. First, as represented by block 84, a signal (e.g., first signal) indicative of at least one pre-tillage image of the field is received. As previously discussed, the at least one pre-tillage image of the field may include a multispectral image and/or a hyperspectral image of the field. Next, as represented by block 86, a crop residue mass map of the field is determined based on the at least one pre-tillage image. For example, an NDVI map of the field may be determined based on the at least one pre-tillage image, and the crop residue mass map of the field may be determined based on the NDVI map. A signal (e.g., second signal) indicative of a position of the agricultural tillage implement within the field is then received, as represented by block 88. In certain embodiments, a signal (e.g., fourth signal) indicative of a topographical map of the field is received, as represented by block 90, and/or a signal (e.g., fifth signal) indicative of a soil property map of the field is received, as represented by block 92.

Next, as represented by block 94, a target penetration depth, a target downforce, a target ground speed, or a combination thereof, of the ground engaging tool(s) is determined based on the crop residue mass map of the field and the position of the agricultural tillage implement within the field. In certain embodiments, the target penetration depth, the target downforce, the target ground speed, or the combination thereof, may also be determined based on the topographical map and/or the soil property map. A signal (e.g., third signal) indicative of instructions to control actuator(s) coupled to the ground engaging tool(s) is then output based on the target penetration depth, the target downforce, the target ground speed, or the combination thereof, as represented by block 96. For example, the instructions may cause the actuator(s) to position the ground engaging tool(s) such that the penetration depth of the ground engaging tool(s) is substantially equal to the target penetration depth. Additionally or alternatively, the instructions may cause the actuator(s) to apply a force to the ground engaging tool(s) such that the downforce applied by the ground engaging tool(s) to the soil is substantially equal to the target downforce.

The steps of the method 82 may be performed in the order disclosed herein or in any suitable order. In addition, the method 82 may be performed by the controller of the agricultural tillage implement, the controller of the work vehicle, another suitable controller, or any combination thereof.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement controller having a memory and a processor, wherein the agricultural implement controller is configured to:
    receive a signal indicative of at least one pre-tillage image of a field;
    determine a crop residue mass map of the field based on the at least one pre-tillage image;

receive a signal indicative of a position of an agricultural tillage implement within the field;

receive a signal indicative of a topographical map of the field;

receive a signal indicative of a soil property map of the field;

determine a target penetration depth, a target downforce, a target ground speed, or a combination thereof, of at least one ground engaging tool of each type of ground engaging tool of a plurality of ground engaging tools carried by the agricultural tillage implement, the plurality of ground engaging tools including two or more types of ground engaging tools including finishing tools, based on a selection of at least one map including the crop residue mass map of the field, the topographical map of the field, and the soil property map of the field, the selected at least one map combined with the position of the agricultural tillage implement; and output a signal indicative of instructions to independently control each actuator of a plurality of actuators at least operatively connected to each ground engaging tool of the plurality of ground engaging tools based on the target penetration depth, the target downforce, the target ground speed, or the combination thereof.

2. The agricultural implement controller of claim 1, wherein the agricultural implement controller is configured to store the target penetration depth, the target downforce, the target ground speed, or the combination thereof.

3. The agricultural implement controller of claim 1, wherein the at least one pre-tillage image of the field comprises a multispectral image, a hyperspectral image, or a combination thereof.

4. The agricultural implement controller of claim 1, wherein the agricultural implement controller is configured to determine a normalized difference vegetation index (NDVI) map of the field based on the at least one pre-tillage image of the field, and the agricultural implement controller is configured to determine the crop residue mass map of the field based on the NDVI map.

5. The agricultural implement controller of claim 1, wherein the agricultural implement controller is associated with the agricultural tillage implement which includes a frame, the plurality of ground engaging tools connected to the frame.

6. An agricultural tillage implement including a frame, comprising:

at least one ground engaging tool of each type of ground engaging tool of a plurality of ground engaging tools carried by the frame;

a plurality of actuators correspondingly at least operatively connected to the plurality of ground engaging tolls to permit individual actuation of each actuator and each ground engaging tool; and a controller having a memory and a processor, wherein the controller is communicatively connected to the at least one actuator, and the controller is configured to:

receive a signal indicative of at least one pre-tillage image of a field;

determine a crop residue mass map of the field based on the at least one pre-tillage image;

receive a signal indicative of a position of the agricultural tillage implement within the field;

receive a signal indicative of a topographical map of the field;

receive a signal indicative of a soil property map of the field;

determine a target penetration depth, a target downforce, a target ground speed, or a combination thereof, of the at least one ground engaging tool of each type of ground engaging tool of a plurality of ground engaging tools connected to the frame, the plurality of ground engaging tools including two or more types of ground engaging tools including finishing tools, based on a selection of at least one map including the crop residue mass map of the field, the topographical map of the field, and the soil property map of the field, the selected at least one map combined with the position of the agricultural tillage implement; and output a signal indicative of instructions to independently control each actuator of a plurality of actuators at least operatively connected to each ground engaging tool of the plurality of ground engaging tools based on the target penetration depth, the target downforce, the target ground speed, or the combination thereof.

7. The agricultural tillage implement of claim 6, wherein the at least one ground engaging tool comprises a finishing assembly.

8. The agricultural tillage implement of claim 6, wherein the controller is configured to store the target penetration depth, the target downforce, or the combination thereof.

9. The agricultural tillage implement of claim 6, wherein the at least one pre-tillage image of the field comprises a multispectral image, a hyperspectral image, or a combination thereof.

10. The agricultural tillage implement of claim 6, wherein the controller is configured to determine a normalized difference vegetation index (NDVI) map of the field based on the at least one pre-tillage image of the field, and the controller is configured to determine the crop residue mass map of the field based on the NDVI map.

11. A method for controlling an agricultural tillage implement, comprising:

providing a controller including a processor;

receiving, via the processor, a signal indicative of at least one pre-tillage image of a field;

determining, via the processor, a crop residue mass map of the field based on the at least one pre-tillage image;

receiving, via the processor, a signal indicative of a position of the agricultural tillage implement within the field;

receive a signal indicative of a topographical map of the field;

receive a signal indicative of a soil property map of the field;

determining, via the processor, a target penetration depth, a target downforce, a target ground speed, or a combination thereof, of at least one ground engaging tool of each type of ground engaging tool of the plurality of ground engaging tools connected to the agricultural tillage implement, the plurality of ground engaging tools including two or more types of ground engaging tools including finishing tools, based on a selection of at least one map including the crop residue mass map of the field, the topographical map of the field, and the soil property map of the field, the selected at least one map combined with the position of the agricultural tillage implement; and outputting, via the processor, a signal indicative of instructions to independently control each actuator of a plurality of actuators at least operatively connected to each ground engaging tool of the plurality of ground engaging tools based on the target penetration depth, the target downforce, the target ground speed, or the combination thereof.

12. The method of claim 11, wherein the at least one pre-tillage image of the field comprises a multispectral image, a hyperspectral image, or a combination thereof.

13. The method of claim 11, comprising:
    determining, via the processor, a normalized difference vegetation index (NDVI) map of the field based on the at least one pre-tillage image of the field; and
    determining, via the processor, the crop residue mass map of the field based on the NDVI map.

* * * * *